(No Model.) 6 Sheets—Sheet 1.
J. P. BULLOCK.
GRAIN BINDER.
No. 452,337. Patented May 12, 1891.
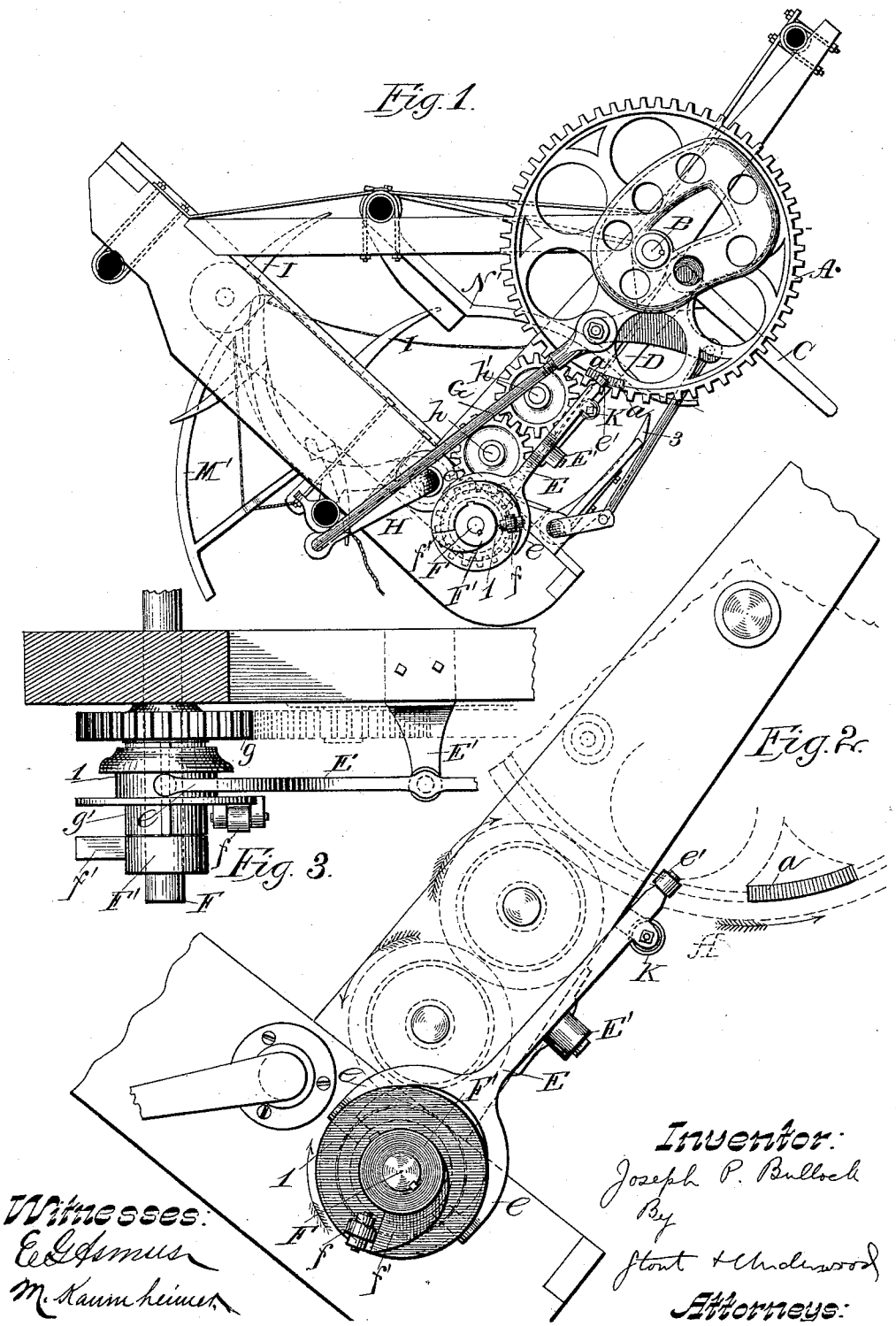

(No Model.)  6 Sheets—Sheet 2.
J. P. BULLOCK.
GRAIN BINDER.
No. 452,337.  Patented May 12, 1891.
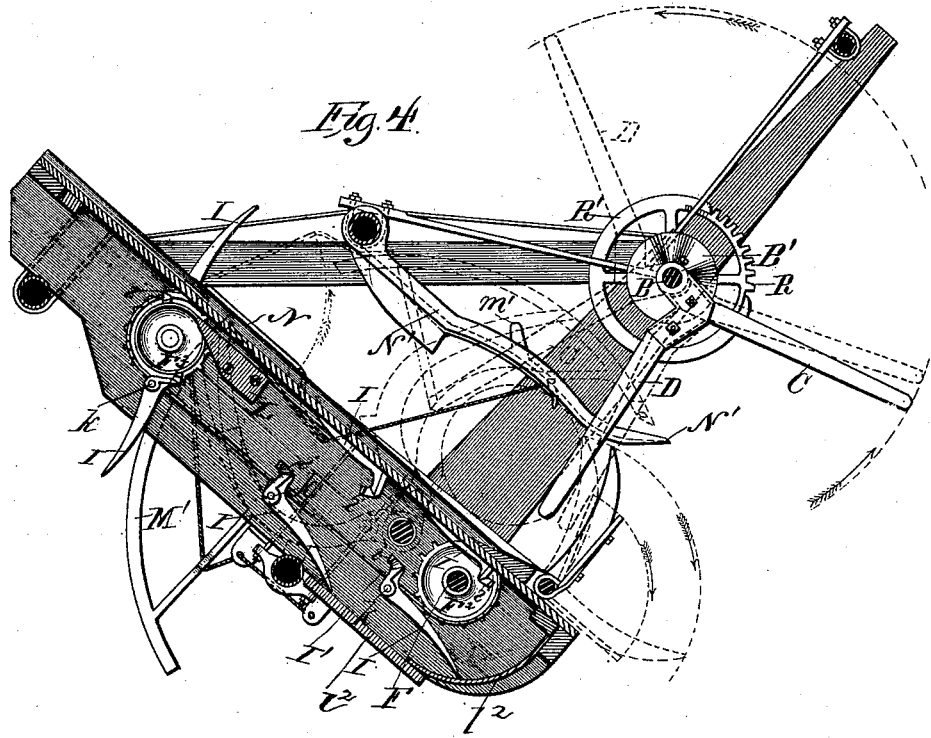
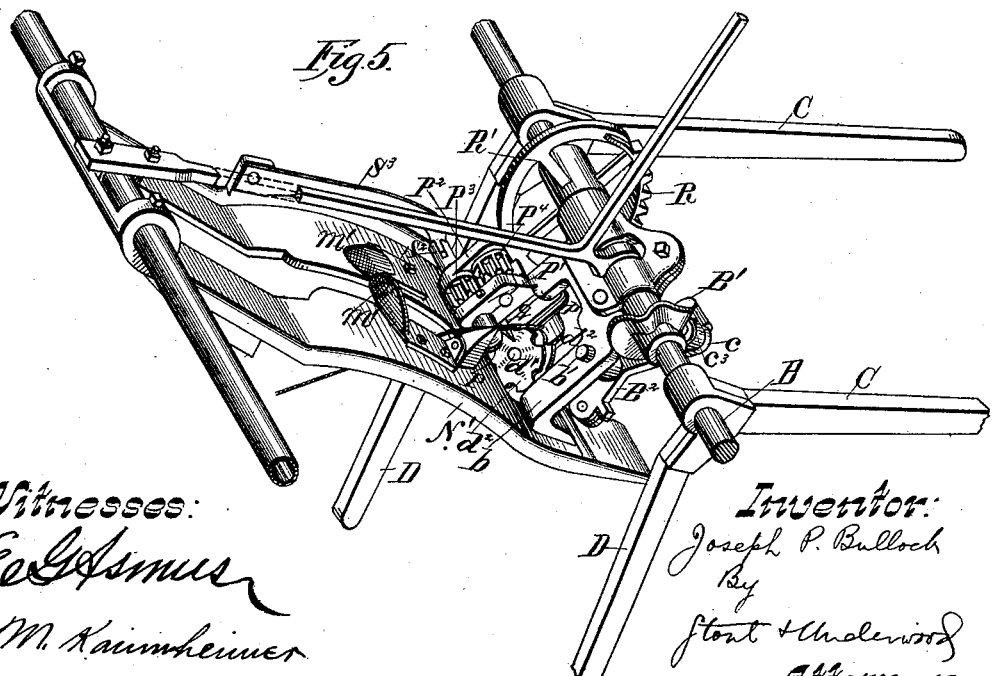
Witnesses:
E. G. Asmus
M. Kaumheimer
Inventor:
Joseph P. Bullock
By
Stout & Underwood
Attorneys.

(No Model.) 6 Sheets—Sheet 3.
J. P. BULLOCK.
GRAIN BINDER.
No. 452,337. Patented May 12, 1891.
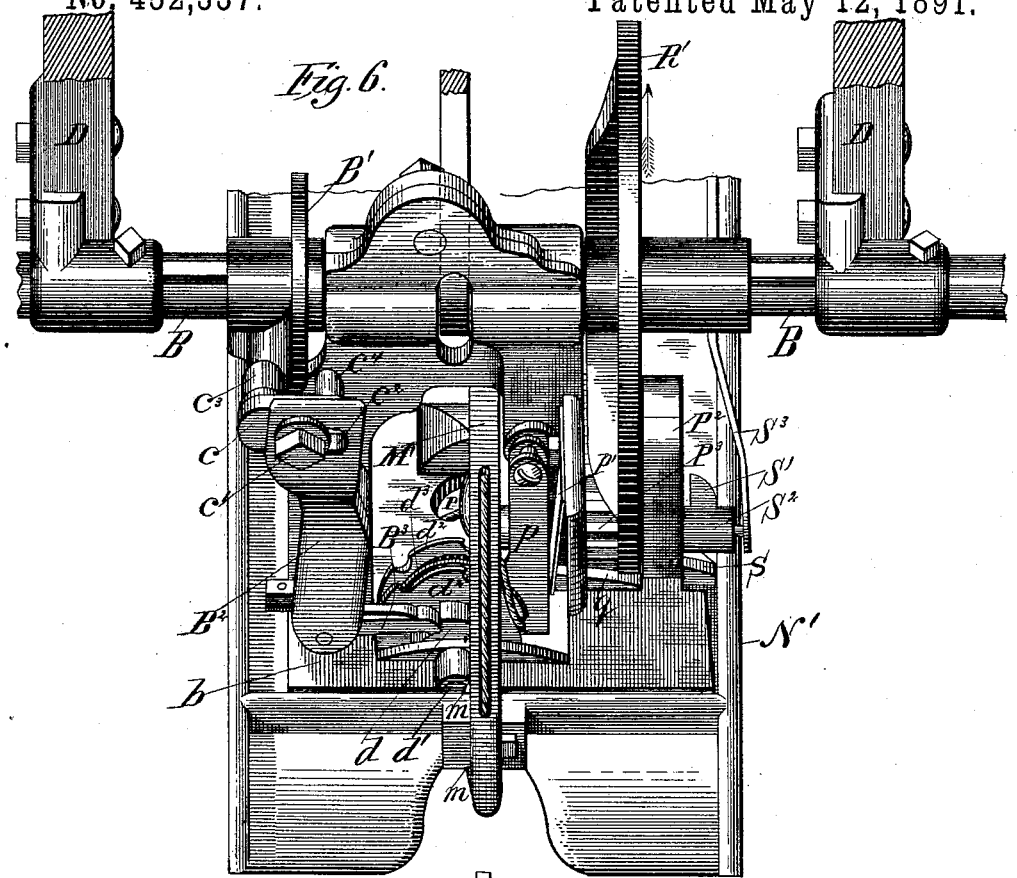
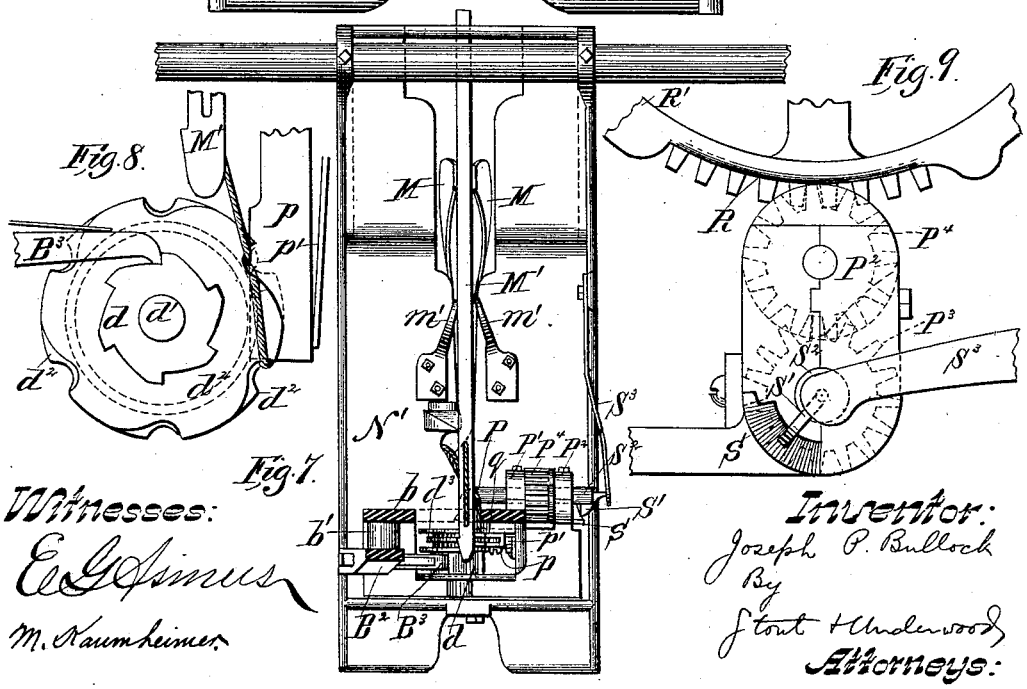
Witnesses:
E. G. Asmus
M. Kaumheimer
Inventor:
Joseph P. Bullock
By
Stout & Underwood
Attorneys

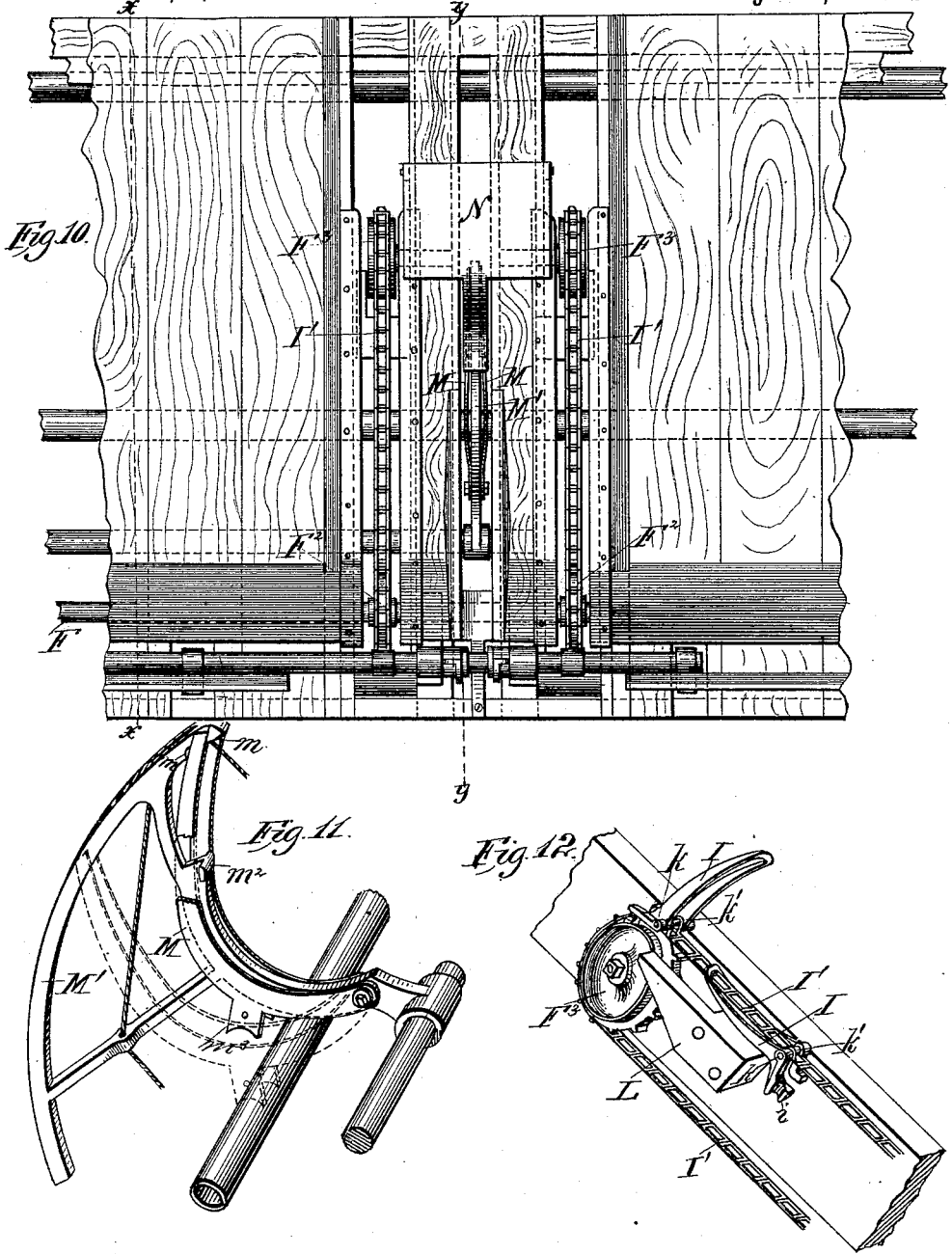

(No Model.)
6 Sheets—Sheet 5.

J. P. BULLOCK.
GRAIN BINDER.

No. 452,337.   Patented May 12, 1891.

Fig. 13.

Witnesses:
E. G. Asmus
M. Laumheimer

Inventor:
Joseph P. Bullock
By
Stout & Underwood
Attorneys.

(No Model.)  J. P. BULLOCK.  6 Sheets—Sheet 6.
GRAIN BINDER.

No. 452,337.  Patented May 12, 1891.

Witnesses
Geo. W. Young
Wm Klug

Inventor
Joseph P. Bullock
ass'r to
Milwaukee Harvester Co.
By H. G. Underwood
Attorney

UNITED STATES PATENT OFFICE.

JOSEPH P. BULLOCK, OF MILWAUKEE, WISCONSIN.

GRAIN-BINDER.

SPECIFICATION forming part of Letters Patent No. 452,337, dated May 12, 1891.

Application filed May 11, 1883. Serial No. 94,665. (No model.)

*To all whom it may concern:*

Be it known that I, JOSEPH P. BULLOCK, of Milwaukee, in the county of Milwaukee, and in the State of Wisconsin, have invented certain new and useful Improvements in Grain-Binders; and I do hereby declare that the following is a full, clear, and exact description thereof.

My invention relates to grain-binders; and it consists in certain improvements, which will be fully set forth hereinafter.

Figure 14:
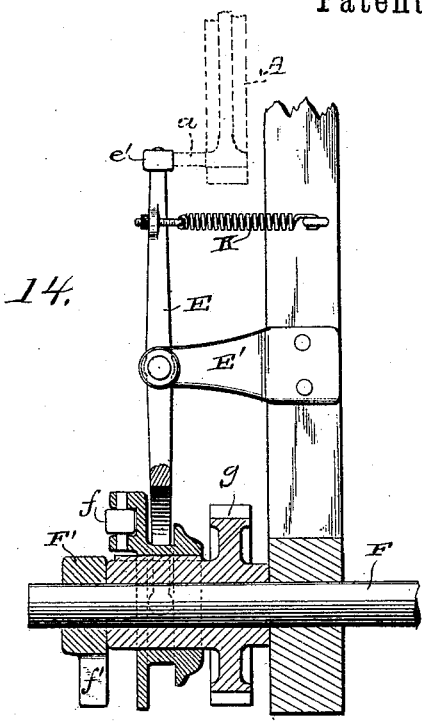
Figure 15:
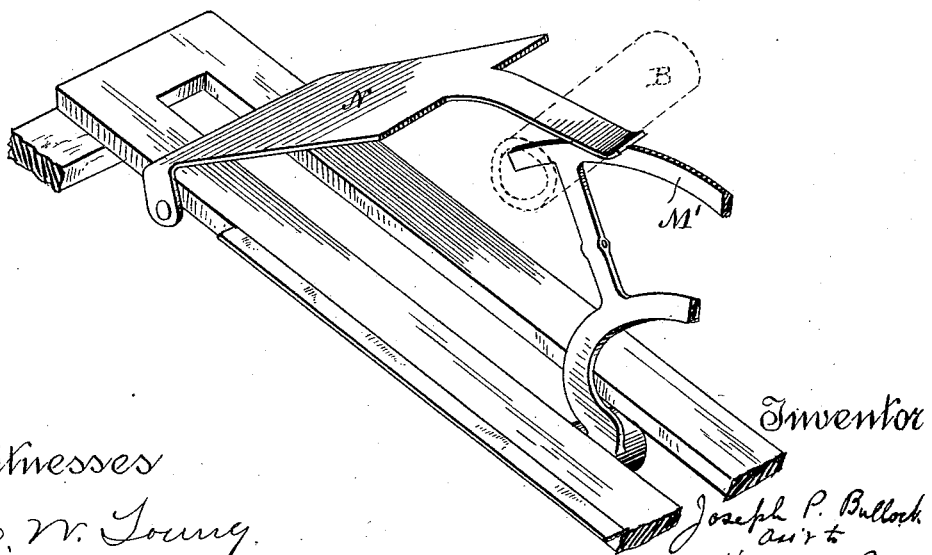

In the drawings, Figure 1 is a side view of my device. Figs. 2 and 3 are details. Fig. 4 is a vertical section through the binder-frame. Fig. 5 is a perspective view of the tying mechanism. Fig. 6 is a rear view, and Fig. 7 is a plan view, of the same. Figs. 8 and 9 are details. Fig. 10 is a plan view of the center of the binding-table. Fig. 11 is a detail of the needle. Fig. 12 is a detail of a portion of the packer with the tyer and its shaft removed; and Fig. 13 is a cross-section through the entire binder on the line $y\ y$ of Fig. 10. Fig. 14 is a detail elevation, partly in section, illustrating the clutch-operating mechanism on the driving-shaft. Fig. 15 is an enlarged detail perspective view of the divider and adjacent parts.

A is the cam-wheel, and B is the tyer-shaft. C is a discharge-arm that projects from the tyer-shaft, and D is a tripping-arm that also projects from the tyer-shaft.

E is a lever, which is bifurcated at one end, as at $e$, and carries a roller $e'$ at the other. This lever is pivoted to the end of the binder-frame at E'.

F is the driving-shaft, and $g$ is a pinion, having a sleeve $g'$, that fits loosely on the shaft, and on this sleeve a clutch 1 is keyed loosely, so that while the sleeve $g'$ may turn freely on shaft F, or vice versa, the clutch 1 may slide longitudinally on the sleeve.

A roller $f$ is mounted in the outer face of clutch 1 near its periphery, and I secure a collar F' on the outer end of shaft F, which I provide with a tooth $f'$. The roller end of lever E is connected with the binder-frame by a spring K, that has a continual tendency to draw the roller up against the rim of wheel A, and consequently to force its bifurcated end out, and as lugs projecting inward from the bifurcations of lever E enter an annular groove in the circumference of the clutch when this end of lever E is thrown out it will slide the clutch with it and throw the roller $f$ into engagement with the tooth $f'$, and therefore as the shaft F turns it will impart its motion through the clutch to pinion $g$ and intermediate gearing $h\ h'$ to the wheel A and tyer-shaft B. Now wheel A will make just one revolution in the direction of the arrow and only one, for just as it completes one turn a cam $a$ on its rim enters beneath the roller $e$ and wedges that end of lever E out from the binder-frame and causes its bifurcated end to throw the clutch 1 in and carry roller $f$ out of engagement with tooth $f'$ on collar F', thus permitting the shaft F to revolve independently of the clutch and stopping the tying mechanism.

I I are the packers, which are secured to and project from endless belts I', which belts run over pulleys $F^2$, that are carried by the driving-shaft and extend up to and around other pulleys $F^3$, that are mounted in the upper part of the binder-frame, and of course these belts travel constantly when the driving-shaft is in motion. Figs. 4 and 12 of the drawings show the position of the packer-belts and the manner in which the packers are secured to it. Each packer tapers from base to the point, and at its base is offseted to form a heel $i$. There is also an opening through the face of each packer that extends from its point through the heel, so that when the packer is in place it straddles the belt, and just at the offset I secure the packer to the belt by a pivot-bolt $k$, that passes through lugs $k'$ on certain links of the belt, as shown in Fig. 12. Just in front and slightly below each of the upper pulleys $F^3$, I secure a lug L, having an arm that extends up along the outer face of the pulley, and this lug takes the heel of each packer as it is carried up over the pulley and acts as a stop to hold the packer out at right angles to the belt while it is carrying the grain down; but as soon as the belt has carried this packer beyond the lug L the resistance of the grain causes it to fall back and straddle the chain, as shown in Fig. 12, in which position it remains until carried under the lower pulley, when its point falls onto a guide $l^2$, which supports it for about half the distance of its travel, and then lets it drop into a vertical position, so that its heel will strike the under side of the upper pulley, which will carry it at right angles to the belt until it again passes lug L.

The tripping-arm D is secured to the tyer-shaft in such a position that while the machine is merely packing grain it will hang just in front of the compressor and will receive the grain from the packers until a bundle is accumulated; but when this occurs the pressure of the packers acting through the grain will throw the arm D out and cause it to revolve the tyer-shaft far enough to carry the cam $a$ on wheel A from beneath the roller $e'$ and permit that end of lever E to be drawn down upon the rim of wheel A by the spring K and throw the tyer into gear in the manner before described.

M M are guards, which are pivoted near the heel of the needle M', and when the needle is at rest and in the position shown in Fig. 13 their points project up between lugs $m$ $m$ near the point of the needle. The guards are slightly elastic, and therefore when the needle rises up into the breast-plate, wedges $m'$ $m'$ on the breast-plate will receive them and wedge them away from the needle, so as to clear the lugs $m$ $m$ and permit the needle to finish its travel without them. The object of these guards is to protect the cord and prevent the cord from being forced back over the tucker $m^2$, so as to be out of position for the knotter to take it. If it were not for these guards M, the cord (which is threaded in the manner shown in Fig. 11) on becoming slack might readily become entangled with the tucker $m^2$, (shown in said figure;) but said guards cover and protect the side edges of the said tucker at such times as there might otherwise be danger of such entanglement.

N is a divider, which is hinged to the binder-table and projects down over the needle-slot in such a manner that as the needle rises up through the table it raises the divider, which it holds up against the breast-strap N', as shown in dotted lines, Fig. 13, until it has returned and is ready to take another bundle, thus entirely separating the loose grain from the gavel that is being bound. After the needle has finished its forward travel on its return it carries back with it the guards M M, which are still at that point on the needle shown in dotted lines in Fig. 13 and they remain there until the heels $m^3$ on the said guards encounter a longitudinal brace of the binder, which arrests the motion of the guards, and as the needle still further recedes the points of the guards are sprung into their former position between the lugs $m$ $m$ near the point of the needle.

The tyer or knotter shaft B carries a cam B', and a bent lever $B^2$, that is pivoted to the frame $b$ of the knotter at $b'$, carries a lug $c$, that is adjustably secured to it by a bolt $c'$, that passes through a slot $c^2$. This lug has a roller $c^3$ on one end, that engages with the outer face of the cam B', and a stud $c^4$ on its other end, that engages with the inner face of the said cam-wheel. To the lower end of lever $B^2$ a dog $B^3$ is pivoted, and the nose of this dog engages with the teeth of a ratchet-disk $d$ on the shaft $d'$ of the cord-holder wheels $d^2$ $d^2$, and thus at each revolution of the tyer or knotter shaft the lever $B^2$ will be vibrated by the outer face of the cam B' to throw the dog $B^3$ forward and cause its nose to move the ratchet disk $d$ one notch just as the needle has carried the cord down upon the wheels.

There are two holder-wheels $d^2$ $d^2$ and between them the shaft $d'$ carries a disk $d^3$, the edge of which is slightly beveled, and a small frame $p$ is hinged to the knotter-frame, so as to project between the edges of holder-wheels $d^2$ $d^2$ and straddle the edge of disk $d^3$, and behind frame $p$ I fix a spring $p'$, that constantly forces it toward the shaft $d'$, and between the inner holder-wheel $d^2$ and the knotter P, I fix the knife $q$. I use the ordinary bill-knotter, having bearings in plates P' $P^2$, between which it is provided with a pinion $P^3$, above which is mounted another pinion $P^4$ in position to engage with a cog-segment R, on a wheel R', that is keyed to the knotter-shaft B. The hub of pinion $P^4$ is flattened on one side to receive the smooth portion of wheel R' while the knotter is at rest, and plate $P^2$ is provided on its outer face with a cam-lug S, that is in position to receive a tooth S' on the shank $S^2$ of the clamping-toe of an ordinary bill-knotter, so that during the revolution of the knotter the tooth S' will ride over the cam-lug S and draw its shank out against the force of a spring $S^3$ to open the knotter and admit the cord, and then as soon as the knotter has turned far enough to cause the tooth S' to clear the cam-lug S the spring $S^3$ will return the shank $S^2$, and the knotter will close on the cord with a degree of force proportioned to the strength of spring.

Having thus fully described my invention, what I claim as new, and desire to secure by Letters Patent, is—

1. The combination, in a grain-binder, of the clutching mechanism with a trip-arm carried by the tyer-shaft and intermediate mechanism, whereby the pressure of the grain, after a bundle has been collected, trips the clutching mechanism into gear to communicate motion from the driving-shaft to the tying mechanism, as set forth.

2. The backwardly-curved open or skeleton packers I, hinged to an endless chain and adapted to straddle said chain with the sides of the said packers below the outer surface thereof, in combination with suitable pulleys and with lugs for engagement with their heels, as set forth.

3. The combination, in a grain-binder, of the driving-shaft and pulleys carried thereby, other pulleys trunnioned in the upper part of the binder-frame, endless belts passing around said pulleys, lugs arranged adjacent to the upper pulleys, curved guides arranged beneath and adjacent to the lower pulleys, and backwardly-curved open or skeleton packers hinged to said chains and having offset-heels for engagement with the lugs adjacent to the upper pulleys, substantially as set forth.

4. In a grain-binder, the combination of a needle operating from beneath the table and a divider hinged at one end to the frame and normally lying upon the table in the path of and adapted to be struck and raised by the needle in its ascent.

5. In a grain-binder, the combination of the needle having lugs near its point, a breast-plate provided with a slot for the passage of the needle therethrough and wedges on each side of said slot, and elastic guards pivoted on each side of the needle near its head and projecting up between the lugs of the needle-point when said needle is at rest, substantially as set forth.

6. The combination, with the knotter-shaft, of a cam-wheel, a bent lever pivoted to the frame of the knotter and carrying a lug adjustably secured to said lever, said lug having projections for engagement with both faces of the said cam-wheel, a dog pivoted to the lower end of said lever, and cord-holding disks in engagement with said dog, substantially as set forth.

7. In a grain-binder, the combination of a shaft carrying two cord-holder wheels having a disk between them, a frame hinged to the knotter-frame and projecting between the edges of said wheels and straddling the edge of said disk, a spring bearing against said hinged frame, a bill-knotter having bearings in plates, between which it is provided with a pinion, another pinion in engagement with the first-named pinion and having a hub flattened on one side, a wheel keyed to the knotter-shaft above the last-named pinion and having a cog-segment in engagement with the latter, a cam-lug on one of the said plates, a tooth on the bill-knotter for engagement with said cam-lug, and a spring bearing against the same, substantially as set forth.

8. In a grain-binder, the combination, with the binder mechanism driving-shaft, a trip-arm projecting therefrom and adapted to receive the pressure of the accumulating bundle, the driving-wheel on said shaft, and a continuously-moving drive-gearing for said wheel or its shaft, whereby the pressure of the grain on the trip-arm causes a turning of the shaft and the latter actuates the clutch to connect the binder mechanism with its driving-gearing.

In testimony that I claim the foregoing I have hereunto set my hand on this 22d day of December, 1882, in the presence of two witnesses.

JOSEPH P. BULLOCK.

Witnesses:
 STANLEY S. STOUT,
 E. G. ASMUS.

It is hereby certified that Letters Patent No. 452,337, granted May 12, 1891, upon the application of Joseph P. Bullock, of Milwaukee, Wisconsin, for an improvement in "Grain-Binders," was erroneously issued to said Bullock as owner of the said invention; that said Letters Patent should have been issued to *The Milwaukee Harvester Company, of Milwaukee, Wisconsin,* said Milwaukee Harvester Company being sole owner of the entire interest therein, as shown by the record of assignments in this Office; and that said Letters Patent should be read with this correction therein that the same may conform to the record of the case in the Patent Office.

Signed, countersigned, and sealed this 16th day of June, A. D. 1891.

[SEAL.]
                    CYRUS BUSSEY.
                  *Assistant Secretary of the Interior.*

Countersigned:
 C. E. MITCHELL,
   *Commissioner of Patents.*